United States Patent Office 3,325,291
Patented June 13, 1967

3,325,291
PROCESS FOR THE PREPARATION OF SOLUTIONS OF PHOSPHATIDES IN EDIBLE OILS
Hans Eikermann, Cologne-Braunsfeld, and Hans Betzing, Cologne-Sulz, Germany, assignors to A. Natterman & Cie, Cologne-Braunsfeld, Germany
No Drawing. Filed Dec. 16, 1963, Ser. No. 330,621
Claims priority, application Germany, Dec. 29, 1962, N 22,555
11 Claims. (Cl. 99—118)

In the preparation of edible oils from the natural oils, the phosphatides always occurring with the oils are practically completely lost. This is a serious loss for human nutrition, because as is known the phosphatides have a very important biological activity. Consequently efforts have been made to obtain from vegetable oils the so-called whole oils, which contain the valuable natural substances practically unaltered, such as phosphatides. The analysis of a commercial cold-pressed sunflower seed oil, however, gave only a phosphatide content of 0.06%, an amount which is much too small to exert a physiological action.

It has been found surprisingly that any desired amounts of phosphatides can be dissolved in edible oils if monoglycerides which have at least 50% and preferably more than 80% unsaturated fatty acids are used as solvents. It has further been found that the solvent power of these monoglycerides for phosphatides in edible oils is practically unimpaired even if the monoglyceride used is mixed with diglycerides and/or triglycerides, so that the products called monoglycerides as commonly available commercially, which are almost always mixtures of mono-, di- and triglycerides, can also be used. Commercial monoglycerides only contain 45–60% monoglyceride, depending on their manner of preparation. The content of monoglyceride in such commercial product can be increased to over 90% by molecular distillation. It is also possible to use glyceride mixtures with a monoglyceride content lower than that of the common commercial products.

If, however, a high concentration of phosphatide is desired in the edible oil, it is expedient to use monoglyceride with the highest possible purity or a mixture of glycerides with the highest possible content of monoglyceride, because too great a content in the oil of, for example, a glyceride mixture consisting of mixed mono- and diglycerides may be detrimental to the taste of the oil due to the diglyceride, and may also lead to a fine precipitate.

The phosphatides may also be dissolved by heating in oils with the aid of monoglycerides which have mostly saturated fatty acids. These solutions are unstable, however, because these monoglycerides partly precipitate again on cooling the solution.

It has been found that the monoglycerides containing at least 50%, but preferably more than 80%, of unsaturated fatty acids specially suitable for the purpose of the present invention can be obtained from the commercial mixtures of mono-, di- and tri-glycerides as well as from partial glycerides in a simple way by dialysis of such a mixture through a rubber membrane in petroleum ether as solvent, since in this way a concentration of monoglycerides up to 100% is possible. For this purpose the glyceride mixture in the molten state, or dissolved in a little petroleum ether, is placed in a thin-walled rubber tube, this is then tightly tied up and subjected in a Soxhlet apparatus to dialysis towards petroleum ether. During this process, the tri- and di-glyceride molecules pass through the rubber membrane substantially more quickly than the monoglycerides. Therefore the tri- and di-glycerides are concentrated in the dialysate, while in the rubber tube a 90% or even 100% monoglyceride remains, depending on the length of time of the dialysis. The separation is not quantitative, since some monoglyceride also goes through the membrane. To improve the yield, the first dialysate, after evaporation of the greater part of the petroleum ether, may be again placed in the rubber tube and subjected to a second dialysis.

Examples of phosphatides suitable for the purpose of the invention may be mentioned as follows: commercial phosphatides which are called lecithin in spite of their cephalin content, the natural cholinephosphoric acid-diglyceride ester poor in cephalin obtained by the process of the German Patent No. 1,047,597, and the cephalin-free natural cholinephosphoric acid-diglyceride esters obtained by the process of the German published specification No. 1,053,299. These natural cholinephosphoric acid-diglyceride esters containing little or no cephalin are distinguished by a particularly high content of essential vitally-important fatty acids, which considerably increase their physiological nutritive effect as compared with the commercial phosphatide mixtures. The preparation of the natural cholinephosphoric acid-diglyceride esters poor in cephalin from crude vegetable phosphatides, especially crude soya bean phosphatides, is effected by subsequent extractions with acetone and then with alcohol at a temperature not exceeding 35° C., and with exclusion of air or oxygen and in the presence of an inert gas, in such a way that the extraction residue freed from acetone in vacuum and in the presence of an inert gas is subjected to repeated extraction with alcohol, the alcoholic solutions are allowed to stand for several days, then they are freed from the suspended or colloidally dissolved substances and are finally concentrated in vacuum with simultaneous passage of inert gas. For the purpose of separation of the chlolinephosphoric acid-diglyceride ester from cephalin, however, these alcoholic solutions may also be passed with exclusion of light, air or oxygen, through a column which is filled with an alcoholic suspension of an oxide or carbonate of one or more elements of Group II and III of the Periodic System, then the suspension is eluted with alcohol and finally the alcoholic solutions run off are concentrated in vacuum in the presence of an inert gas.

Edible oils concerned with the purpose of the invention are refined oils or fats, as well as the so-called "natural" fats or oils, and also germ oils or other crude and "whole oils" suitable for nutrition.

The advantage of the process of the present invention lies in the fact that relatively very small amounts of monoglycerides which contain at least 50%, but preferably 80%, of unsaturated fatty acids are sufficient to obtain completely clear and stable solutions of phosphatides in a concentration which is physiologically active.

For example, in 100 parts by weight of an edible oil, 2 parts by weight of a natural choline-phosphoric acid-diglyceride ester poor in cephalin or 3 parts by weight of a cephalin-free natural cholinephosphoric acid-diglyceride ester can be dissolved by means of one part by weight of monoglyceride. Thus, in 100 parts of edible oil, any selected desired quantity of phosphatide may be added and homogeneously dissolved therein with the aid of the monoglyceride in the ratio of 1.5 to 3 parts of phosphatide per part of monoglyceride, variable in that range the quantity of cholinephosphoric acid diglyceride ester, present in the phosphatide. If twice the quantity of monoglyceride is used, twice the amount of phosphatide can be dissolved. The solution is advantageously carried out with protection from light and air, using an inert gas with gentle heating and stirring. It is also expedient to add vitamin E to the mixture as an antioxidant.

Since even 500 mg. of a natural cholinephosphoric acid diglyceride ester poor in cephalin obtained according to the German Patent No. 1,047,597 are effective, there needs to be supplied to the human body only a daily amount of 25 g. of an oil which contains 2% of this concentrate. Such an amount is within the bounds of the usual daily consumption.

*Example 1*

50 g. of a commercial 85% unsaturated monoglyceride with 58% linoleic and 27% oleic acid and with a monoglyceride content of 55–60%, the remainder of which consists of di- and tri-glycerides, are dissolved in a little petroleum ether and placed in a thin-walled rubber tube. This is carefully closed with a thin cord and dialysed towards petroleum ether (30–60°) in a Soxhlet apparatus for about 24 hours. After opening, the dialysis residue is freed from petroleum ether by distillation, finally in vacuum. 23 g. remain, containing 87–88% of monoglycerides which are 85% unsaturated.

When the dialysis towards petroleum ether is carried on for 48 hours, 10 g. dialysis residue remain which consist of pure monoglyceride.

In order to increase the yield, the dialysate obtained after 48 hours may be dialysed towards petroleum ether. If, for instance, 100 g. of the dialysate freed from petroleum ether are dialysed in a rubber tube for 70 hours towards petroleum ether, 23 g. of dialysis residue containing 90% of monoglyceride are obtained.

To determine the monoglyceride content, 500 mg. of the dialysis residue are separated by chromatography in a florisil column according to K. K. Carroll (J. Lipid Research 2, 135–1961–).

*Example 2*

100 g. of the glyceride mixture mentioned in Example 1 are melted by gentle warming on a water bath, poured into a rubber tube, which is closed, and dialysed in a Soxhlet for about 50 hours towards petroleum ether. The dialysis residue amounted to 35 g. with a monoglyceride content of 91.6%. To increase the yield the dialysate, as indicated in Example 1, may be dialysed for a longer period in the rubber tube towards petroleum ether.

*Example 3*

1 kg. of soya bean oil is treated with 10 g. of a glyceride mixture containing about 91% of monoglyceride which is 90% unsaturated (60% linoleic, 3% linolenic, and 27% oleic acid) and obtained according to Example 1 or 2, and then 15 g. of soya bean phosphatide freed only from the oil are dissolved, with stirring and if necessary with heating on a water bath at 40–50° C. while protected by an inert gas, advantageously also with exclusion of light.

*Example 4*

As indicated in Example 3, a solution is prepared of 18 g. of a natural cholinephosphoric acid-diglyceride ester poor in cephalin and prepared from crude vegetable phosphatides in the way indicated above, in 1 kg. of maize germ oil using 10 g. of a glyceride mixture with a content of about 91% monoglyceride which is 90% unsaturated.

*Example 5*

A solution of 50 g. of a natural cephalin-free cholinephosphoric acid-diglyceride ester obtained as indicated above, in 2 kg. of sunflower seed oil using 20 g. of a mixture of glycerides with a content of about 91% of monoglyceride which is 90% unsaturated, is prepared in the way indicated in Example 3.

*Example 6*

90 g. of a natural cholinephosphoric acid-diglyceride ester poor in cephalin and 200 g. of a glyceride mixture containing about 55–60% of monoglyceride which is 93% unsaturated (palmitoleic 9%, oleic 76%, and linoleic acid 8%), are mixed with stirring and slight heating. This mixture is added to 5 kg. of previously heated groundnut oil and the stirring continued, and in this case also a clear and stable solution is obtained.

*Example 7*

1 kg. of soya bean oil, to which 500 mg. Alphatocopherol have been added, are treated as indicated in Example 3, and in this case also a clear and stable solution is obtained.

The invention also relates to the solution of phosphatides in edible oils obtained according to the hereinbefore described process.

What we claim is:

1. The process for the preparation of a phosphatide-enriched edible oil as a clear and stable solution therein, comprising dissolving in the edible oil to be enriched a small quantity of monoglyceride having at least 50% unsaturation as a solvent, and an enriching quantity of a phosphatide, the added monoglyceride being present in the ratio of 1.5 to 3 parts of phosphatide per part of monoglyceride.

2. The process defined in claim 1, wherein the monoglyceride is a mixture of mono-, di- and triglycerides, containing at least 45% of monoglyceride.

3. The process as defined in claim 1, wherein the monoglyceride is at least 80% unsaturated.

4. The process as defined in claim 1, wherein the solvent is a mixture of mono-, di- and triglycerides, at least 50% unsaturated, concentrated by dialysis in petroleum ether to a higher concentration of at least 87% monoglycerides.

5. The process for the preparation of a phosphatide-enriched edible oil comprising dissolving 2 parts of cephaline-poor phosphatide in 100 parts of the oil in the presence of an additional dissolved quantity of at least 1 part of at least 80% unsaturated monoglyceride as a solvent for the phosphatide in the edible oil.

6. The process for the preparation of a phosphatide-enriched edible oil comprising dissolving 3 parts of cephalin-free phosphatide in 100 parts of the oil in the presence of an additional dissolved quantity of at least 1 part of at least 80% unsaturated monoglyceride as a solvent for the phosphatide in the edible oil.

7. A phosphatide-enriched edible oil comprising a stable solution in said oil of at least 1.5 to 3 parts of phosphatide per part of solvent for said phosphatide in said oil, said solvent comprising monoglycerides at least 50% unsaturated.

8. The product defined in claim 7, wherein the phosphatide is cephalin poor.

9. The product defined in claim 7, wherein the monoglycerides are at least 80% unsaturated.

10. The product defined in claim 7, wherein the monoglycerides are contained in a mixture of mono-, di- and triglycerides containing at least 45% monoglycerides.

11. The product defined in claim 7, wherein the monoglyceride is a dialyzed mixture of mono-, di- and triglycerides containing at least 87% monoglyceride, said monoglyceride being at least 80% unsaturated.

References Cited

UNITED STATES PATENTS

| 2,267,224 | 12/1941 | Taylor et al. | 99—123 X |
| 2,773,771 | 12/1956 | Julian et al. | 99—15 |
| 2,777,817 | 1/1957 | Werly | 99—15 X |

OTHER REFERENCES

Bailey, A. E.: "Industrial Oil and Fat Products," Interscience Publ. Co., New York, 1951, p. 823.

Sinclair, H. M.: "Essential Fatty Acids," 1958 Butterworth, London, pp. 43–46.

A. LOUIS MONACELL, *Primary Examiner.*

RAYMOND N. JONES, *Examiner.*

M. W. GREENSTEIN, *Assistant Examiner.*